J. L. LEAS.
Pumps.

No. 157,406.  Patented Dec. 1, 1874.

WITNESSES:
P. C. Dieterich
W. C. McArthur

INVENTOR.
John L. Leas
per T. R. Alexander
ATTORNEY.

UNITED STATES PATENT OFFICE.

JOHN L. LEAS, OF PINE HILL, PENNSYLVANIA.

IMPROVEMENT IN PUMPS.

Specification forming part of Letters Patent No. 157,406, dated December 1, 1874; application filed October 17, 1874.

*To all whom it may concern:*

Be it known that I, JOHN L. LEAS, of Pine Hill, in the county of York and State of Pennsylvania, have invented certain new and useful Improvements in Pumps; and I do hereby declare that the following is a full, clear, and exact description thereof, reference being had to the accompanying drawings, and to the letters of reference marked thereon, which form part of this specification.

The nature of my invention consists in the construction and arrangement of a suction and force pump operated by means of springs or weights, as will be hereinafter more fully set forth.

In order to enable others skilled in the art to which my invention appertains to make and use the same, I will now proceed to describe its construction and operation, referring to the annexed drawing, in which—

Figure 1:
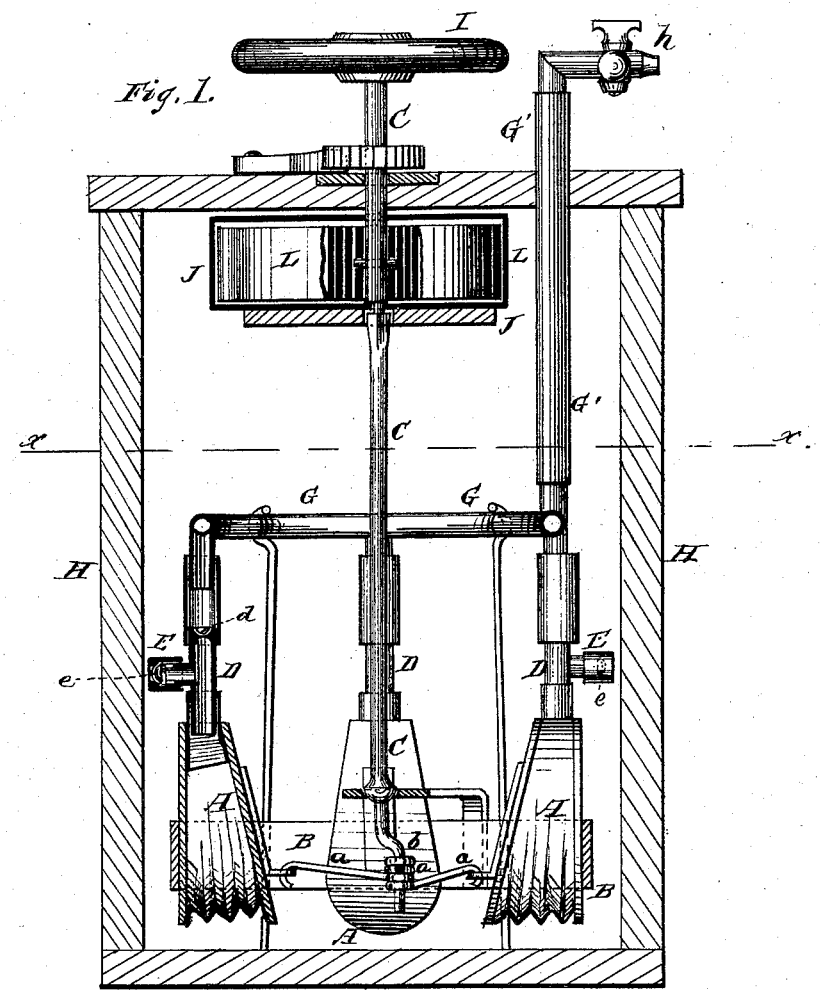
Figure 2:
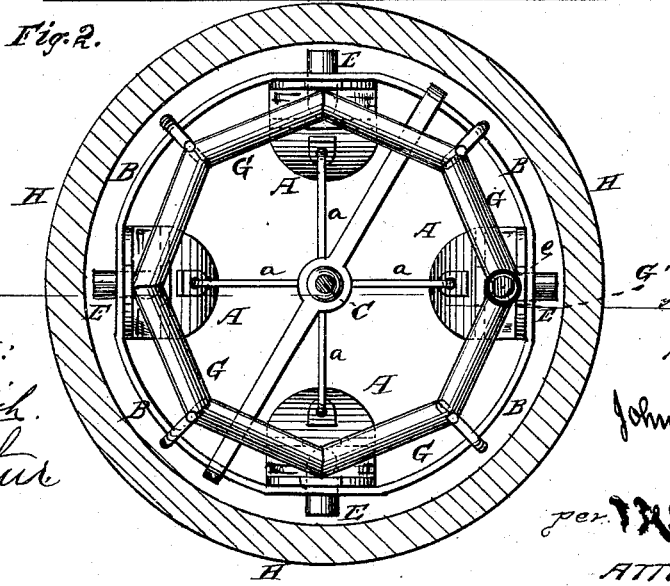

Figure 1 is a central vertical section, and Fig. 2 is a cross-section on line $x\ x$ of the same.

In my pump I use one or more bellows, A, constructed in any suitable manner and of such material as to be both water and air tight. One side of each bellows A is attached to a stationary frame, B, while the other side is connected by a rod, $a$, with a crank, $b$, formed upon a shaft, C. The bellows A connect with a pipe, D, within which is a valve, $d$, so arranged as to close while the bellows are being opened, and open while the bellows are being compressed or closed. From the pipe D extends a pipe, E, to the water-supply, said pipe entering the pipe D between the valve $d$ and the bellows; and in said pipe E is a valve, $e$, so constructed that it will open while the bellows is being opened, and close while the bellows is being compressed or closed. When more than one bellows is used the pipes D D all lead into one common pipe, G, from which a pipe, G′, leads to the point where the water is wanted, and at this point a suitable spigot or faucet, $h$, is placed in the pipe.

The entire apparatus is or may be inclosed within a casing, H, through which the shaft C extends, and said shaft is, outside of the casing, provided with a crank or hand-wheel, I.

Within the casing H is a small box, J, containing a coil-spring, L, one end of which is fastened to said box and the other end to the shaft C, which passes centrally through the same.

The operation of this pump is as follows: The spring L being wound up, the shaft C, with its crank $b$, revolves, and, by means of the connecting-rods $a\ a$, operates the bellows A A, to draw water from the supply through the pipes E E, and force it through the pipes D, G, and G′ to the outlet. If the faucet or valve $h$ is closed the bellows will cease to operate as soon as these pipes are full, and, as soon as the valve $h$ is opened and the water passes out, the bellows again commence to operate and keep up the supply, and so on until the spring is run down, when it can be again wound up.

This pump can be used with any number of bellows, according to the supply of water required, and it can be used for various purposes.

Having thus fully described my invention, what I claim as new, and desire to secure by Letters Patent, is—

1. The combination of the bellows A, frame B, connecting-rod $a$, shaft C with crank $b$, and spring L, substantially as and for the purposes herein set forth.

2. The combination, with the bellows A, of the pipe D with valve $d$, supply-pipe E with valve $e$, and outlet-pipe G G′ with faucet or valve $h$, all constructed and arranged to operate, substantially as and for the purposes herein set forth.

In testimony that I claim the foregoing as my own, I affix my signature in presence of two witnesses.

JOHN L. LEAS.

Witnesses:
T. H. ALEXANDER,
C. ALEXANDER.